July 10, 1951 — M. KATZ — 2,559,967
RETRACTABLE SHOCK ABSORBER, PARTICULARLY FOR AIRCRAFT LANDING GEAR
Filed Sept. 30, 1946 — 2 Sheets-Sheet 1
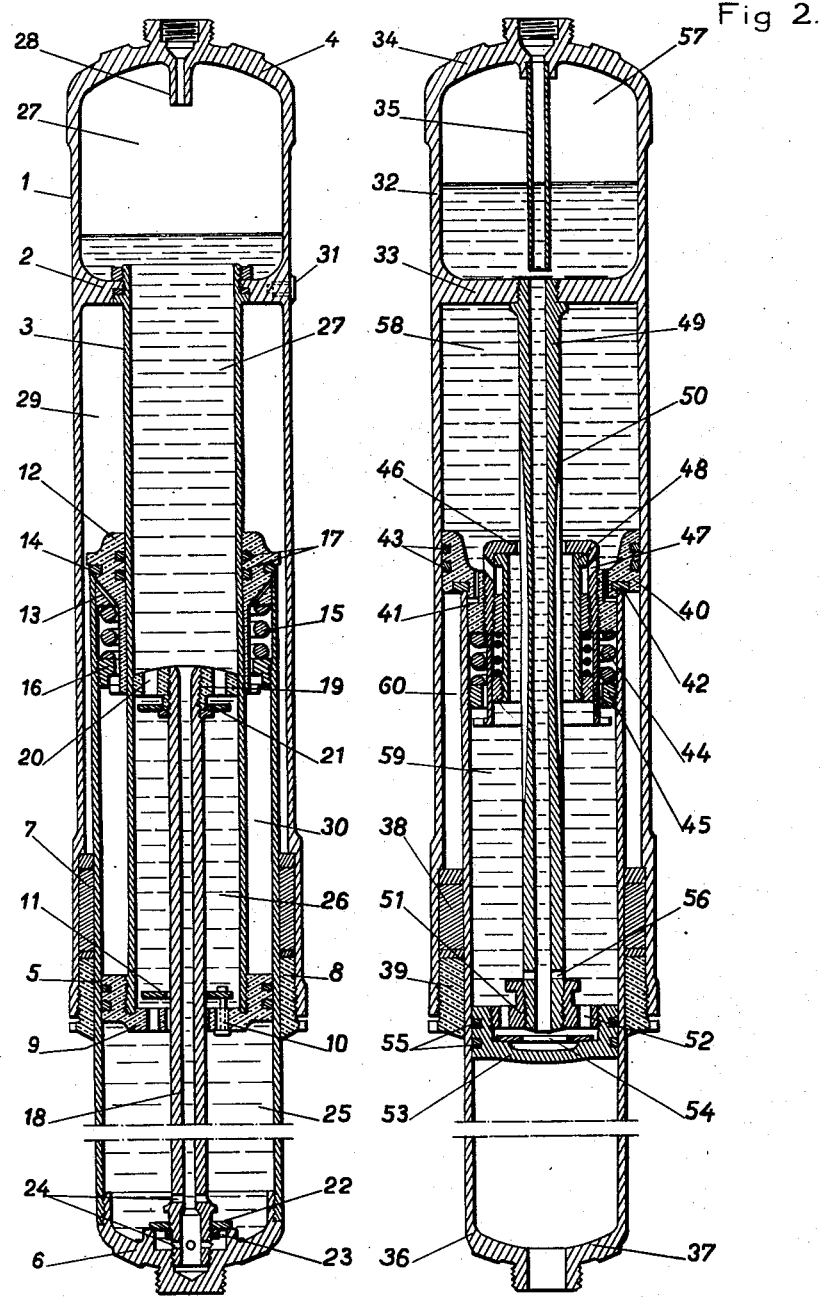
Fig. 1 — Fig. 2
INVENTOR
Maurice Katz.
BY Cameron, Kerkam, & Sutton
ATTORNEYS

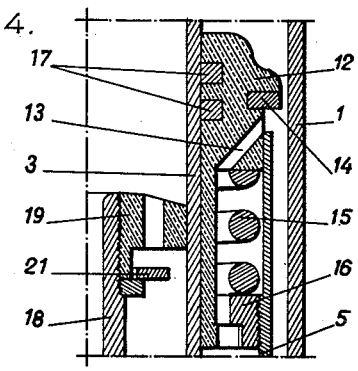

Patented July 10, 1951

2,559,967

UNITED STATES PATENT OFFICE 2,559,967

RETRACTABLE SHOCK ABSORBER, PARTICULARLY FOR AIRCRAFT LANDING GEARS

Maurice Katz, Coulouse, France

Application September 30, 1946, Serial No. 700,329
In France October 25, 1945

14 Claims. (Cl. 267—64)

The present invention relates to a shock absorber which can be completely or partially shortened to reduce the space occupied by the absorber when it is not being untilized under normal operational conditions.

It is particularly necessary thus to shorten shock absorbers employed in aircraft landing gear retractable into the engine nacelles or the wings, which do not afford sufficient space to accommodate the entirely extended landing gear.

In order to obtain this retraction of shock absorbers when not fulfilling their normal shock absorbing function it has hitherto been necessary to employ a considerable driving or retracting force corresponding to the force developed by the shock absorber during its use.

The present invention overcomes this disadvantage by providing a retractable shock absorber which can be retracted by a compressive force weaker than that required to overcome the resistance set up under normal conditions of use by the elastic element by which its extension is ensured.

Such shock absorbers have a powerful extending force, either mechanical or pneumatic, in relation to the weight suspended, and must be compressed for example at landing against considerable resistance in relation to the shock to be absorbed. The invention facilitates retraction by providing at least one hydraulic or pneumatic compression chamber and one chamber to which the hydraulic or pneumatic fluid may be transferred during retraction, the communication between these chambers being controlled by a movable closing member subjected to the action of a suitable force, such as a spring, gravity, etc. The closing member is maintained in its closed position against the action of this force only when a powerful pressure is generated in the compression chamber, for example at the time of the impact upon landing, but is held open by the said suitable force as long as the pressure produced in the compression chamber is relatively low as is the case, for example, during the slow retraction of the shock absorber that is carried out before or during raising it into a part of the aircraft.

According to a form of embodiment, the closing member has the form of a sliding sleeve having one side bearing against the end of a cooperating wall and thereby covering and closing an annular transfer chamber of substantial extent, the other side of said sleeve being subjected to the pressure prevailing in the compression chamber so that in the closed position, the pressure prevailing in the compression chamber acts on the sleeve over the annular area of the transfer chamber while in the open position this pressure acts only on the small cross sectional area of the end of the said wall.

Numerous further features are embodied in three constructional forms given as non-limitative examples and corresponding:

1. to a shock absorber in which retraction is facilitated by the transfer of the fluid which also forms the elastic element of the absorber, such as compressed air, for example.

2. to a shock absorber in which retraction is facilitated by the transfer of the energy dissipating liquid, the elastic element exerting its pressure through the intermediary of this liquid, and 3. to a shock absorber in which transfer of the energy dissipating or shock absorbing liquid is also employed, but in which the pressure of the elastic element may be completely nullified.

These three forms of embodiment of the invention are illustrated in the accompanying drawings by Figures 1, 2 and 3, which show longitudinal sections taken along the axes of the shock absorbers while they are partially compressed during the absorption of a shock.

Figures 4, 5 and 6 show, on a larger scale and in half-section, the respective positions occupied during retraction by the members for controlling the transfer of fluid of each of the three shock absorbers.

In the first example (Figure 1) the shock absorber comprises a fixed cylinder 1 rigidly secured by a fluid-tight partition 2 to an inner concentric cylinder 3, the whole being secured by a spherical support 4 to the fuselage, and a movable part 5 constituted by a cylinder telescoping within the annular space between cylinders 1 and 3 and bearing by its spherical end 6 against the members accommodating the wheel, which are not shown in the drawing.

A stuffing-box packing 7, secured by means of a nut 8 to the lower part of the cylinder 1 ensures fluid-tightness between the outer fixed cylinder and the outer surface of the movable cylinder 5.

In addition, the inner cylinder 3 carries at its lower extremity a piston 9 having fluid-tight engagement with the inner surface of the cylinder 5 and orifices 10 therein which are so arranged as to be covered and closed at times by a ring 11.

Movable within the upper end of the movable cylinder 5 is a sleeve 12 having orifices 13 therein which are only covered when the said sleeve bears against the edge of the cylinder 5. This engagement, which forms a fluid-tight joint 14, takes place against the action of a spring 15 resting on the nut 16 screwed in the cylinder 5. The packing rings 17 permit the sleeve 12 to slide in a fluid-tight manner on the outer wall of the fixed element 3.

The movable part 5 carries, secured to its cover 6, a hollow rod 18 extending through a central opening in the piston 9 and provided with a piston 19 engaging the inner surface of the fixed cylinder 3, said piston 19 having orifices 20 which are closed during the extension of the absorber by a ring 21.

Another ring 22 covers orifices 23 in the cover 6 and consequently closes the lower of two sets of orifices 24 which extend through the lower extremity of the rod 18 below the orifices 23 and open into its hollow bore.

The various elements hereinbefore mentioned divide the assembly of the shock absorber into several parts which form at 25, 26 and 27 chambers containing a suitable liquid delivered through a connection 28, and at 29 and 30 two chambers containing compressed air or any other suitable gas delivered through any connection, such as 31 for example.

The shock absorber operates in the following manner:

When the aircraft is preparing to land, the shock absorber is entirely extended; the nut 16 of the cylinder 5 rests on the piston 9 of the inner fixed cylinder 3 and, owing to the action of the spring 15, the sleeve 12 occupies the position of Figure 4; that is to say, the orifices 13 are uncovered so that the pressure of the compressed air is the same in the chamber 29 as in the chamber 30. At this time the chamber 30 is very small, practically all of the annular space between the cylinders 1 and 3 being included in the chamber 29. However, when a shock occurs on the movable part 5, it is rapidly telescoped and, owing to the small section of the orifices 13, sets up a strong super-pressure in the chamber 29. This super-pressure, which acts over the entire section of the sleeve 12 between the tubes 3 and 5, applies this sleeve against the edge of the tube 5, compressing its spring 15 and also completely cutting off the chamber 30 from the chamber 29. Thus practically the whole of the compressed air is enclosed in the chamber 29 and is compressed as the telescopic movement continues, while at the same time the volume of chamber 30 increases and the pressure therein decreases correspondingly. Hence a considerable resistance to the telescoping movement is set up.

Moreover, the liquid filling the chamber 25 is throttled partly through the orifices 10 and the annular space between the central bore of the piston 9 and the rod 18 into chamber 26 and partly through the upper orifices 24 into the chamber 27, the orifices 23 being covered by the ring 22. This throttling causes a hydraulic reaction which contributes to the absorption of the energy of the shock.

When the shock is entirely absorbed, the pressure of the compressed air contained in the chamber 29 and exerted through the intermediary of the sleeve 12 on the movable part 5, tends to remove this part 5 from the fixed part 1. The liquid contained in the chamber 26 brakes this expansion movement by closing simultaneously the orifices 10 and 20 respectively by means of the rings 11 and 21 and only passing into the chamber 25 through the small annular space between the rod 18 and the central bore of the piston 9.

The liquid situated in the chamber 27 passes freely, by gravity or under slight pressure, which can readily be set up, into the chamber 25 through the rod 18, all the orifices 24 and the orifices 23, the ring 22 being thus lifted.

The whole assembly is thus again in position to absorb a further shock.

If the extension is not complete, for example when the aircraft is travelling on the ground or is at rest on the ground after landing, the sleeve 12 remains applied against the upper edge of the movable tube 5, owing to the great difference between the pressures prevailing in the chambers 29 and 30. The elastic suspension is thus ensured in all cases, and has the advantage over known shock absorbers that the counter pressure of the air in the chamber 30, which is particularly substantial at the beginning of the stroke, renders the compression curve steeper and consequently the whole less sensitive to the various frictional forces.

When the extension is complete, for example when the aircraft has left the ground and it is desired to retract its landing gear while shortening the absorber, the pressures in the chambers 29 and 30 are equalized; the sleeve 12, under the action of the spring 15, or better still, by abutting against the piston 9, leaves its seat and uncovers the orifices 13, thus establishing free communication between the chambers 29 and 30 (Figure 4).

The telescoping movement of the movable part 5 during retraction, which takes place very slowly creates in the chamber 29 a super-pressure which is so slight that it is absolutely incapable of overcoming the resistance of the spring 15 in order to lower the sleeve 12.

Thus, the air passing freely through the orifices 13 into the chamber 30 only undergoes an insignificant compression and exerts its pressure only on a very small surface which is that of the cross section of the metal of the tube 5, so that a considerably smaller force is required to telescope the movable part 5 than in the case of a shock as described above.

The hydraulic reaction due to the throttling does not add much to this force, since it decreases as the square of the speed of the telescoping movement.

The shock absorber could also function in the inverse direction subject to a suitable arrangement of the passages for the liquid.

The tube 5 would then form the fixed upper part secured to the fuselage and the tube 1 the movable lower part rigid with the wheel. The advantage of this arrangement would be to reduce somewhat the overall dimensions owing to the fact that the volume of liquid would be slightly less.

In the second example of practical embodiment of the invention (Figure 2), which is the preferred form, the compressed air exerts its pressure directly on the liquid which alone is in contact with the different fluid-tight joints whereby their preparation is facilitated.

The fixed cylinder 32, which is divided by a partition 33 into two compartments, bears on the fuselage by means of a spherical cap 34 provided with a gauge tube 35 and hermetically closed at the top by a joint of any known type (not shown in the figure) serving for the replenishment of liquid and of compressed air.

The movable part bearing on the wheel is constituted by a tube 36 telescoping within the cylinder 32 and terminated at its lower part by a spherical support 37, which is arranged to communicate freely with the atmosphere.

A stuffing-box 38, secured by a nut 39 to the lower part of the fixed tube 32, ensures the fluid-tightness of the telescopic assembly.

The sliding tube 36 is provided at its upper extremity with a movable piston 40 having small orifices 41 therein and with an annular joint 42 adapted to seat against the upper end of the tube 36. Two other joints 43 in the form of packing rings permit the piston 40 to slide in a fluid-tight manner on the inner wall of the tube 32. A spring 44 bearing against a nut 45 screwed in the tube 36 tends to maintain the piston in the position shown in Figure 5.

The piston 40 is made rigid with a diaphragm 46 having orifices 47 therein which may be closed by a movable spring-type slide valve 48. This valve is mechanically brought into the position for closing these orifices when the absorber is completely extended by engagement with a flange provided on a stop 51 secured to the extremity of a tube 49. It is held in closed position throughout shock absorption by the strong pressure generated in the chamber 58 at the moment of the landing impact and transmitted through passages 47 to the valve. However, it is forced into its open position by a suitable calibrated spring as soon as an expansion takes place in the compression chamber, thus forming a communication between this compression chamber 58 and the liquid delivery chamber 59 in order to impart flexibility to the shock absorber in particular during running (see my patent application Serial No. 601,483, filed June 25, 1945, now Patent No. 2,539,841, issued Jan. 30, 1951).

The tube 49 is fixed to the partition 33 and is provided with grooves 50 of suitable profile to regulate the throttling effect between it and the diaphragm 46. It carries at its lower extremity the stop 51 mentioned above which is provided with orifices 52 opening into a hollow piston 53 rigidly connected to the stop, a ring 54 being disposed in the piston to control the passage of liquid through the orifices 52.

The piston 53 is thus rigid with the fixed element 32 and slides within the cylinder 36, the piston having packing rings 55 which render the sliding joint fluid-tight. The tube 49 also has small orifices 56 in its lower part above the orifices 52.

When the shock absorber is entirely extended the chamber 57, formed in the top of the tube 32 by the partition 33, is almost entirely occupied by compressed air or by any other suitable gas. The lower part of the absorber below the partition 33 is composed of the chambers 58 and 59 separated by piston 40 and diaphragm 46, these chambers being entirely filled with liquid. The chamber 60 which is formed between the cylinders 32 and 36 during the compression movement, is sometimes empty and sometimes filled with liquid.

This shock absorber functions in the following manner:

Before the aircraft lands, the shock absorber is completely extended and the piston 40 is removed from its seat (position shown in Figure 5) so that the chamber 58 communicates with the chamber 60 through the orifices 41. However, owing to the small section of the orifices 41 and since at the moment of the impact the speed of the telescoping movement of the movable part 36 is very high, there is set up in the chamber 58 a strong super-pressure which applies the piston 40 against its seat against the action of the spring 44, thus interrupting the communication between the chambers 58 and 60.

The liquid passes from chamber 58 through the space left between the diaphragm 46 and the grooved tube 49 into the chamber 59, being throttled and producing a great reaction, and then passes freely from the chamber 59 through the orifices 56 and above all through the orifices 52 into the interior of the tube 49 and up to the chamber 57, compressing the air therein.

The orifices 47 of large section remain covered during the whole of the compression phase by the slide valve 48, which is closed at the start by the stop 51, and remains in this position owing to the pressure of the liquid prevailing in the chamber 58.

Thus, the resistance set up by the shock absorber during compression due to shock is very high and is equal to the sum of the hydraulic reaction of the liquid and of the pressure of the compressed air which is exerted on an annular surface comprised between the two inner circumferences of the cylinders 32 and 36.

This pressure of the compressed air ensures the extension of the shock absorber when the energy of the shock is absorbed. During extension the liquid contained in the chamber 57 first passes through the tube 49 and, striking against the face of the piston 53, lifts the ring 54 which closes the wide orifices 52. The liquid can no longer escape into the chamber 59 except through the small orifices 56, and an energetic braking of the extension is thus effected. From the chamber 59, the liquid passes freely into the chamber 58 through the orifices 47 which are now uncovered by the slide valve 48, the latter having been opened by its spring as soon as pressure in the chamber 58 was relieved.

If the extension is not complete (when the aircraft is traveling along the ground or is stationary), the piston 40 always remains applied against its seat and the pressure of the compressed air exerted over a large surface is sufficiently great to ensure the suspension of the aircraft. The suspension is moreover very flexible owing to the considerable reduction of the hydraulic reaction as a result of the opening of the supplementary orifices 47 for the passage of the liquid in both directions. It is not possible for the orifices 47 to be covered again until after the complete extension of the shock absorber to bring the valve 48 into engagement with the stop 51.

When the aircraft leaves the ground and prepares to retract its landing gear, which is accompanied by a complete or partial shortening of the shock absorber according to the case, the shock absorber is entirely extended.

The piston 40 is lifted from the upper edge of the sliding tube 36 owing to the action of the spring 44 and particularly by the action of the multiple stops, and re-establishes free communication between the chambers 58 and 60.

The very slow retracting movement of the movable part 36 no longer creates in the chamber 58 a super-pressure which is sufficient to overcome the resistance of the spring 44. Thus during retraction the liquid contained in the chamber 58 passes without offering any appreciable resistance into the chambers 60 and 59 and, in a very reduced quantity only, into the chamber 57.

The volume of the compressed air is therefore no longer substantially modified and in addition its pressure is now only exerted over a very small surface which is equal to the cross section of the metal of the sliding tube 36, whereby the force required to retract the shock absorber is considerably reduced.

The third example of application of the invention illustrated in Figures 3 and 6 relates to a shock absorber in which the force required for retraction can be reduced to a considerably greater extent than in the first two forms of embodiment and can even be reduced to zero if the passive resistances are disregarded.

It comprises essentially a fixed part 61 of cylindrical form secured to the fuselage by a fork 62 and provided with a connection 63 for the replenishment of liquid, and a telescoping cylindrical part 64 hermetically closed by a cover 65 which is fixed by means of a fork 66 to the frame rigidly connected to the wheel. The movable cylinder 64 carries at its upper end means forming a fluid-tight sliding joint and comprising a stuffing-box 67 between the cylinders 61 and 64 which is locked by a nut 68. A partition 69 in the lower part of the movable tube 64 forms a chamber 70 in which moves a piston 71 carrying a rod 72 passing through the center of the partition 69 and being provided with grooves 73. The partition 69 has orifices 74 therein which are covered at landing and during the ensuing compression stroke by a slide valve 75 comprising a spring, the operation of which is like that of the valve 48 of the preceding example.

The fixed tube 61 carries a piston-like member 76 at its lower end which comprises a tubular part screwed in the end of the tube 61 and a collar having a sliding fluid-tight fit within the tube 64. Said collar is provided with orifices 77 of large section opening into the annular space between cylinders 61 and 64, which can be closed by a ring 78. Inside the tubular body of the piston member 76 is disposed a shoulder and valve seat 79 against which a sleeve-valve 80 abuts, compressing its spring 81 which bears on the one hand against a nut 82 rigid with the sleeve 80 and on the other hand against a nut 83 screwed inside the tube 61. Small calibrated orifices 84 establish free communication, when the valve 80 is in the position indicated by Figure 6, between the liquid chamber 85 and the chamber 86 into which the liquid is transferred during retraction. The annular space between the tubes 61 and 64, above the piston 76 comprises a further chamber 87 which receives liquid freely through the orifices 77 during compression, but these orifices are closed by ring 78 during extension by and escape of liquid from the chamber 87 is throttled through small orifices 88 in the body of the piston 76 which are not covered by the ring 78, thus braking the extension movement.

The operation of this shock absorber is based on the same principle as that of the two preceding forms:

When the landing shock is exerted on the movable tube 64, this tubes rises rapidly and sets up in the chamber 85, owing to its high speed, a powerful super-pressure which closes the valve 80 against the action of the spring 81. Part of the liquid can then pass from the chamber 85 relatively freely through orifices 77 into the chamber 87, but the remainder of the liquid is throttled under great resistance through the central aperture of the partition 69, thus forcing back the piston 71 and compressing the air in the chamber 70 below the piston. The grooved rod 72 integral with the piston 71 thus controls the section of flow of the liquid over the whole of its compression stroke with a view to ensuring maximum efficiency.

The shock having been absorbed, the compressed air situated in the chamber 70 exerts its pressure on the piston 71 which transmits it to all the mass of the liquid and thus ensures the extension which is braked by the liquid passing from the chamber 87 through the small orifices 88 into the chamber 85, the ring 78 being closed. While the aircraft is on the ground, it remains suspended by air pressure in the chamber 70.

The valve 80 cannot leave its seat until the piston 71 abuts against the partition 69 in order to nullify the pressure prevailing in the chamber 85, that is to say until the shock absorber is entirely extended. The latter condition is fulfilled only when the aircraft leaves the ground, whereupon valve 80 is opened by spring 81 and the orifices 84 are uncovered. During the slow shortening of the shock absorber which takes place on retraction of the landing gear, the liquid passes into the chamber 86 without forcing back the piston 71 which remains in abutment against the partition 69. The effort required for the retraction thus depends on the calibration of the orifices 84 and can be reduced to only that required to overcome the passive resistances.

However, it is also possible, in order to ensure the extension of the telescopic elements of the landing gear when lowered, to maintain in the chamber 86 a small air pressure which could, moreover, be set up only at the moment when the gear is lowered, or again to ensure this extension by an independent spring, or by the actual weight of the movable part of the gear.

Various modifications in the examples of embodiment described and illustrated are possible, and the constructional details may be varied without departing from the invention.

I claim:

1. A retractable shock absorber particularly adaptable to use in retractable landing gear of aircraft comprising a pair of telescoping members and partition means dividing the space enclosed by said members into chambers including a pressure chamber and an auxiliary chamber, said pressure chamber containing a gaseous medium compressible by compression of said telescoping members and providing an elastic cushion tending to extend said members, and means for relieving the pressure in said pressure chamber during slow compression of said members from their fully extended position comprising a closing member for said auxiliary chamber that is subjected to the fluid pressure existing in said pressure chamber and urged thereby toward closed position, means biasing said closing member toward open position in opposition to said fluid pressure, and means forming a restricted passage for conducting fluid from the pressure side of said closing member into said auxiliary chamber, said passage being closed when said closing member is in closed position and open when said closing member is in open position, said biasing means moving said closing member to open position when said telescoping members are fully extended and said fluid pressure drops to its minimum value and maintaining said closing member in open position throughout subsequent slow compression during which accumulation of fluid pressure is prevented by said open passage, said fluid pressure building up on subsequent sudden compression due to the restriction of said passage to move said closing member to and maintain it in closed position until the next full extension of said telescoping members.

2. A shock absorber according to claim 1, including a liquid-filled chamber in said telescoping members which decreases in volume on compression of said telescoping members, said liquid-filled chamber having a restricted outlet for hydraulic energy dissipation.

3. A shock absorber according to claim 1, said telescoping members being spaced radially to provide said auxiliary chamber between them in annular form, said closing member being mounted on and movable with the end of one telescoping member in sliding engagement with the other telescoping member, said closing member also being movable relative to the end of said one member between said open and closed positions.

4. A shock absorber according to claim 3, said biasing means comprising a spring bearing at one end against said closing member and at the other end against a fixed point on said one telescoping member.

5. A shock absorber according to claim 3, said closing member comprising a portion overlapping the end of the wall of said one telescoping member, said restricted passage being formed in said portion and one end of said passage being covered by said wall when said closing member is in closed position and uncovered when said closing member is in open position.

6. A shock absorber according to claim 3, said other telescoping member comprising concentric inner and outer walls and said one telescoping member moving between said walls with said closing member sliding on one of said walls to form said auxiliary chamber, the other of said walls having sliding engagement with said one telescoping member to form said pressure chamber.

7. A shock absorber according to claim 3, the inner telescoping member having a closure at its end and the other telescoping member carrying a piston sliding in said inner member and cooperating with said closure to form a liquid-filled chamber which decreases in volume on compression of said telescoping members, said chamber having a restricted liquid outlet for hydraulic energy dissipation.

8. A retractable shock absorber particularly adapted to use in retractable landing gear of aircraft comprising a pair of telescoping members, one of said members having partition means forming therein a pressure chamber containing a gaseous medium compressible by compression of said telescoping members and providing an elastic cushion tending to extend said members, the other member carrying piston means cooperating with said partition means to form a second liquid-filled chamber which decreases in volume on compression of said members, said second chamber having a restricted outlet from which liquid is delivered to said pressure chamber for hydraulic energy dissipation and to compress said gaseous medium, said telescoping members also forming a third auxiliary chamber, and means for relieving the pressure in said pressure chamber during slow compression of said telescoping members from their fully extended position comprising a closing member for said auxiliary chamber that is subjected to the liquid pressure in said second chamber and urged thereby toward closed position, means biasing said closing member toward open position in opposition to said liquid pressure, and means forming a restricted passage for conducting liquid from the pressure side of said closing member into said auxiliary chamber, said passage being closed when said closing member is in closed position and open when said closing member is in open position, said biasing means moving said closing member to open position when said telescoping members are fully extended and said liquid pressure drops to its minimum value and maintaining said closing member in open position throughout subsequent slow compression during which accumulation of pressure in said pressure chamber is prevented by said open passage, said pressure building up on subsequent sudden compression due to the restriction of said passage to move said closing member to and maintain it in closed position until the next full extension of said telescoping members.

9. A shock absorber according to claim 8, said liquid-filled chamber also having a substantially unrestricted liquid outlet, and pressure-actuated valve means subjected to the pressure in said liquid-filled chamber and movable to a position opening said unrestricted outlet when said pressure drops on extension of said telescoping members.

10. A shock absorber according to claim 9, said valve means being movable positively to a position closing said unrestricted outlet by movement of said telescoping members to fully extended position, said valve means being maintained in closed position during subsequent sudden compression of said telescoping members and until the next extension of said telescoping members by the pressure built up in said liquid-filled chamber.

11. A shock absorber according to claim 8, said partition means extending across the outer telescoping member and said piston means being carried by the inner telescoping member and having sliding engagement with said outer telescoping member, said auxiliary chamber comprising the annular space between said telescoping members, said piston means being movable relative to said inner telescoping member and having a portion cooperating with the wall of said inner telescoping member and operating as said closing member.

12. A shock absorber according to claim 11, said pressure chamber being formed in the end of said outer telescoping member beyond said partition means, said piston means having a central aperture, and a tubular member extending from said partition through said aperture to provide said restricted outlet, said tubular member having apertures beyond said piston means whereby liquid escaping through said outlet may pass through the tubular member and partition to said pressure chamber.

13. A shock absorber according to claim 8, said partition means extending across the outer telescoping member and said piston means being carried by the inner telescoping member and having sliding engagement with the outer telescoping member, said auxiliary chamber being formed in the end of said inner telescoping member beyond said piston means and said pressure chamber being formed in the end of said outer telescoping member beyond said partition means.

14. A shock absorber according to claim 13, said pressure chamber having a floating piston therein and a member carried by said floating piston and projecting through an aperture in said partition means to provide said restricted outlet.

MAURICE KATZ.

REFERENCES CITED

The following references are of record in the file of this patent:

UNITED STATES PATENTS

| Number | Name | Date |
| --- | --- | --- |
| 1,918,699 | Gruss | July 18, 1933 |
| 2,156,117 | Johnson | Apr. 25, 1939 |
| 2,171,827 | Elliot | Sept. 5, 1939 |
| 2,224,306 | Krueger | Dec. 10, 1940 |
| 2,410,716 | Cook | Nov. 5, 1946 |
| 2,423,736 | Tack | July 8, 1947 |